Figure 1:
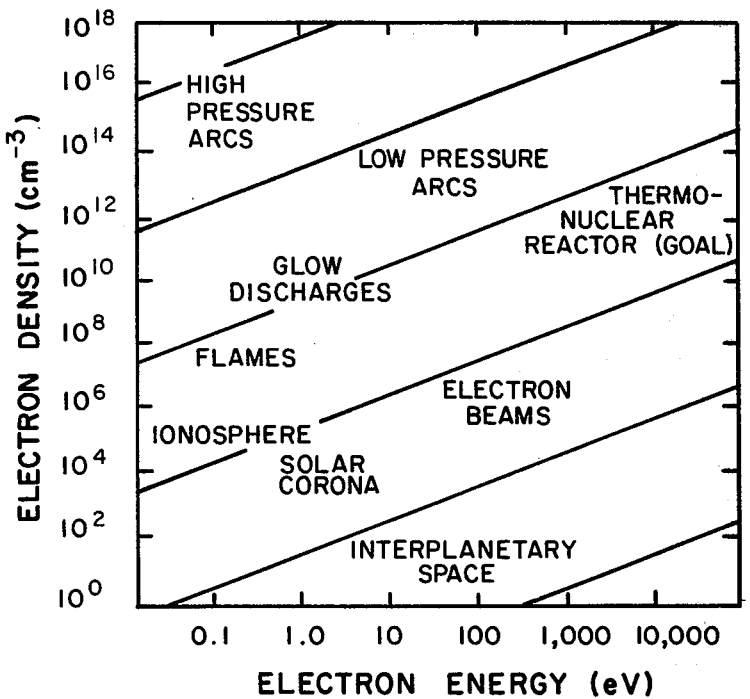

United States Patent

Blenner et al.

[11] 4,348,426
[45] Sep. 7, 1982

[54] METHOD FOR BONDING SILICONE ELASTOMERS TO METAL SUBSTRATES

[75] Inventors: Donald R. Blenner, Erie; Robert A. Auerbach, Allison Park; Herman V. Boenig, Erie, all of Pa.

[73] Assignee: Lord Corporation, Erie, Pa.

[21] Appl. No.: 276,216

[22] Filed: Jun. 22, 1981

[51] Int. Cl.$^3$ .............................................. B05D 3/06
[52] U.S. Cl. ................................ 427/41; 148/6.15 R; 148/6.15 Z
[58] Field of Search ........................... 427/38, 41, 39; 148/6.15 Z, 6.15 R; 204/192 E

[56] References Cited

U.S. PATENT DOCUMENTS 3,654,108 4/1972 Smith, Jr. ...................... 204/192 E

FOREIGN PATENT DOCUMENTS 55-18548 5/1980 Japan ..................................... 427/39

Primary Examiner—Evan K. Lawrence
Attorney, Agent, or Firm—John A. Gazewood

[57] ABSTRACT

Adhesion of silicone elastomers to metal substrates, especially zinc phosphatized metal substrates, is significantly improved by exposing the substrate to a glow discharge plasma selected from the group consisting of at least one inert gas, at least one organosilicon compound or a combination thereof, prior to the application of any adhesive materials to such substrates.

9 Claims, 2 Drawing Figures

METHOD FOR BONDING SILICONE ELASTOMERS TO METAL SUBSTRATES

This invention relates to bonding of elastomeric compositions. More particularly, the invention is concerned with the bonding of vulcanizable silicone elastomers to metal substrates, especially to zinc-phosphatized metal substrates.

Laminates and composite structures wherein natural and synthetic elastomers are adhesively bonded to metal substrates are well known. There are any number of general purpose adhesives which can be used alone or in combination with metal adhesive primers which are effective to provide rubber-tearing bonds, the desired failure condition of rubber-metal bonded assemblies, and at least moderate levels of environmental resistance with the more common elastomers, such as natural, neoprene and SBR rubbers. Either or both adhesion and environmental resistance can generally be improved by the use of conversion treatments, such as zinc phosphatizing. However, conventional rubber-metal adhesive systems are generally ineffective with specialty elastomers, such as silicone, fluorocarbon and polyester rubbers, which are especially suited for many applications because of their unusual characteristics, such as high heat resistance or chemical resistance. Such specialty elastomers generally require specific adhesives especially tailored to the elastomers. In application areas requiring bonding of specialty elastomers to treated metals, such as zinc-phosphatized steel, even the use of adhesive systems especially tailored for the elastomer are not effective to obtain desired levels of adhesion. To overcome this problem, either the adhesive must be modified or the treated metal subjected to further treatment, and at times both, in order to enhance the adhesion between the elastomer and the treated metal. While solutions to this problem are known, there is nevertheless a continuing need for other alternative solutions.

The present invention provides a novel and unobvious method of enhancing the adhesion of vulcanizable silicone elastomer compositions to phosphatized metal surfaces through the use of gas plasma processes. More particularly, the bonding method of the present invention comprises treating phosphatized metal in the presence of certain glow discharge plasmas, applying an adhesive composition suitable for bonding silicone elastomer compositions to metals to the plasma-treated phosphatized metal, contacting the adhesively-coated plasma-treated phosphatized metal with a vulcanizable silicone elastomer composition, and subjecting the resulting assembly to conditions of heat and pressure for a time sufficient to effect vulcanization of the rubber composition and curing of the adhesive composition.

FIG. 1 discloses types and properties of known electrical discharges; and

Figure 2:
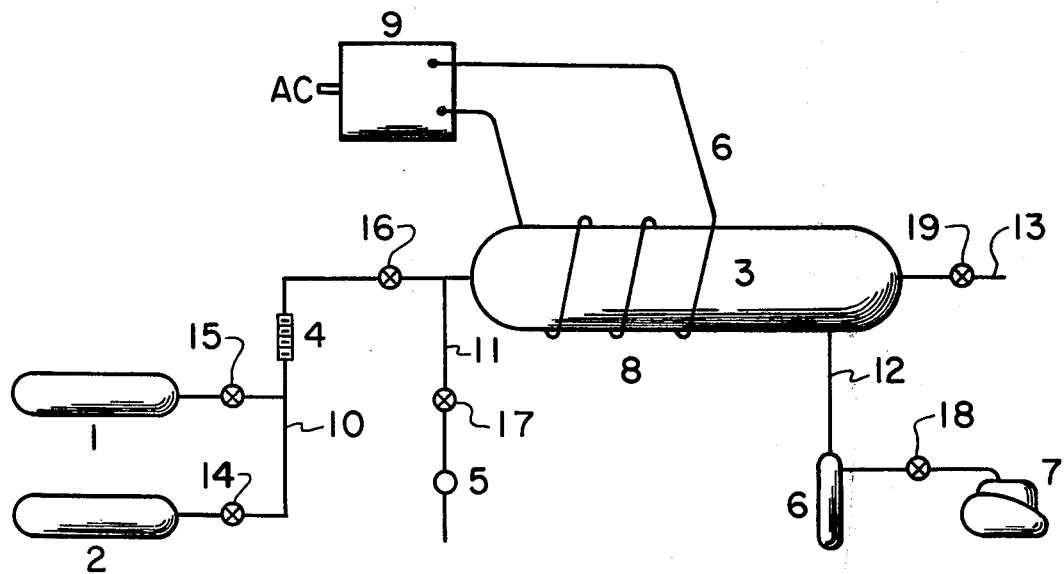

FIG. 2 is a schematic diagram of an apparatus which can be employed in the practice of the invention.

Plasma chemistry deals with chemical reactions which occur in an at least partially ionized gas which is composed of ions, free radicals, and neutrals. This "fourth state of matter" can be achieved by the action of very high temperatures or strong electrical or magnetic fields. The present invention is concerned with ionized gases produced by an electrical discharge in a gaseous medium. In such a discharge, free electrons gain energy from the applied electric field and collide with neutral gas molecules. In the process, energy is transferred to the molecules and leads to the formation of a plethora of new specie, including free radicals (molecular specie with unpaired electrons), ions (specie with whole positive or negative charges), atoms, and metastables (energetic fragments which are transient and decay to lower energy states). These various specie are available to participate in different chemical and physical processes.

Of the several types of electrical discharges which can create plasmas, see FIG. 1, the present invention utilizes those plasmas generally characterized as "glow discharges" and which are defined by electron energies of 1–10 eV and electron densities of $10^9$–$10^{12}$ cm$^{-3}$. Additionally, such plasmas lack equilibrium between the electron temperature Te and the gas temperature Tg. Typically, ratios for Te/Tg lie in the range 10–$10^2$. This lack of thermal equilibrium can provide a plasma in which the gas temperature is near ambient value but in which electron energies are sufficiently high to rupture molecular bonds and kinetically cause other transformations. Depending on the gaseous medium, plasmas may be chemically reactive, that is, the plasma gas components may become involved in substrate surface reactions, or non-reactive, that is, the plasma gas components do not become involved in such substrate reactions. These non-reactive plasmas are usually regarded as predominantly physical processes in which the energetic ions, although unable to react chemically with the substrate surface, impart kinetic energy and momentum to surface atoms or molecules to eject from the surface.

The "low-temperature" or non-equilibrium electric glow discharge plasmas which are utilized in the practice of the invention typically involve coupling radio frequency or microwave power to a discharge zone, with the former being currently preferred. At RF frequencies, either inductive or capacitative types of coupling are employed. Suitable plasmas can be formed with a radio frequency discharge operated between 0 to 100 megahertz and 1 to 600 watts or with a microwave discharge operated between 400 to 4000 megahertz and 20 to 400 watts. The wattage considerations are based on a five-inch diameter reactor and will vary somewhat with reactor size. The residence or treating period within the reaction zone is generally from 10 minutes to 20 hours, preferably 30 minutes to 2 hours, although residence times outside these limits can often be advantageous.

Phosphatized substrates which are treated in accordance with the invention are provided by well-known metallurgical processes involving the treatment of metal surfaces to provide a coating of relatively compact, insoluble metal phosphates strongly adherent to the base metal. Phosphatizing processes are of major industrial importance to the protection of iron and steel surfaces and may be applied as a protective treatment for zinc, aluminum, cadmium and magnesium-based metals, including alloys of these metals. Typically, phosphatizing solutions contain one or more of the phosphates of iron, maganese or zinc in dilute phosphorid acids, as well as alkali metal and alkaline earth metal phosphates, to a lesser degree, with zinc phosphate treatments being the most widely used. Although not necessary to the invention, phosphatizing treatments typically are applied to all exposed metal surfaces.

The silicone rubbers which are more effectively bonded to phosphatized metals in accordance with this invention comprise substantially any of the currently available heat-curable elastomeric organosilicon polymers, that is, organopolysiloxanes, which, upon heating in combination with an appropriate curing agent, are converted to the solid, elastic state. Silicone elastomers are well known in the art, and the specific silicone rubber which is employed in the practice of the invention is not critical and may be selected from any of the currently available varieties. As is conventional, the silicone rubber may contain a curing agent, such as benzoyl peroxide or di-t-butyl peroxide, as well as conventional filler and other rubber compounding materials.

In a first embodiment of the invention, phosphatized metal substrates are prepared for bonding to vulcanizable silicone rubbers by a treatment comprising exposing at least that portion of the metal substrate which is to be subsequently bonded in a zone of electric discharge plasma to a gaseous medium consisting essentially of at least one non-reactive gas. It is critical that the entire portion of the phosphatized metal which is to be bonded be entirely within the visible plasma. In a second and preferred embodiment of the invention, following the non-reactive gas plasma treatment, the phospatized metal substrate is further treated by exposure in a zone of electric discharge plasma to a gaseous medium consisting essentially of at least one chemically reactive monomeric silazane compound which is vaporizable under reaction conditions, said monomeric silazane compound having the general formula

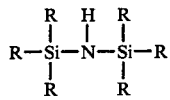

wherein each R can be the same or different, and each is individually selected from the group consisting of hydrogen, halogen, saturated or unsaturated aliphatic and haloaliphatic radical having from one to 8 carbon atoms, saturated and unsaturated cycloaliphatic and halocycloaliphatic radical having 5, 6 or 7 ring carbon atoms and aromatic and haloaromatic radical having 6 or 10 nuclear carbon atoms. Representative silazane monomers include, without limitation, hexamethyl disilazane, tetramethyl disilazane, dichloromethyltetramethyl disilazane, tri(dichloromethyl) cyclohexyl disilazane, trimethylphenyl disilazane, trimethylcyclohexane disilazane and trimethyl cyclopentadiene disilazane, with hexamethyl disilazane being currently preferred. Non-reactive inert ionizable gases which can be employed in the invention include helium, nitrogen, neon, argon, krypton and xenon, with argon being currently preferred.

The plasma-treated phosphatized metal substrates are readily bonded to vulcanizable silicone rubbers employing any adhesive composition which is known to be suitable for bonding heat-vulcanizable silicone rubbers to metal substrates. Suitable adhesive compositions include both one-coat and two-coat systems, as these terms are interpreted in the adhesive arts, and are so well-known as to require no detailed discussion.

The silicone adhesive compositions are applied to the plasma-treated phosphatized metal substrates in a conventional manner, such as by dipping, spraying and brushing, preferably immediately following termination of the plasma treatment. Preferably, the applied adhesive film, whether comprising a single-coat adhesive composition or a two-coat adhesive composition, is allowed to dry before being contacted with the vulcanizably silicone rubber composition. Subsequent to forming the rubber-metal assembly, with the adhesive disposed between the rubber and treated metal, the assembly is cured by heating in accordance with conventional practices. The exact conditions will depend on the particular silicone elastomer being bonded and the adhesive system which is employed, and will generally be at a temperature in the range from 20° C. to 200° C. for from 5 minutes to 24 hours.

The invention will be more fully described with reference to FIG. 2, which is a schematic diagram of an apparatus which can be employed in the practice of the invention.

As shown in FIG. 2, there are provided non-reactive gas 1 and reactive monomer reservoir 2 with conduit means to deliver either or both non-reactive gas and reactive monomer to reactor 3. A flowmeter 4 is provided for measuring gas flow rates and a vacuum gauge 5 is provided in conduit 11 to monitor the pressure within the reactor system. Valves 14, 15, 16 and 17 are provided in conduits 10 and 11 to regulate the flow rate of non-reactive and reactive monomer materials to reactor 3. Prior to use, reactor 3 is evacuated by opening valve 18 to vacuum source 7. A suitable helical coil 8 is connected to a suitable radio frequency oscillator 9, which can be operated at a frequency in the range from 0 to 100 megahertz. Substrates to be treated in accordance with the invention are placed on an appropriate rack, not shown, in a staggered configuration and disposed within the reaction zone. The bond surface area of the substrates must be located entirely within the visible plasma region. The reactor system also includes a trap 6 and vent conduit 13 and its valve 19.

The following examples are illustrative of the present invention. It should be understood that such examples are not to be construed as to unduly limit the invention. In these examples, unless otherwise noted, the equipment is operated at a frequency of 21.0 megahertz, with a power input of 40 watts and a system pressure, with non-reactive gas and reactive monomer materials, is 30–50 microns. Typically, phosphatized metal substrates are loaded in the reactor and located in a staggered configuration within the boundaries defined by the helical coil. The reaction chamber is evacuated to a pressure of 5–10 microns, flushed with argon gas, and then adjusted to the desired pressure, 500–2000 microns of non-reactive gas, or 30–50 microns of reactive monomer. The phosphatized metal parts are treated for the desired time and then removed from the reactor for subsequent treatment with adhesive. After appropriate treatment, the treated metal parts are bonded to the unvulcanized silicone elastomer, under appropriate conditions of heat and pressure to simultaneously vulcanize the silicone elastomer and cure the adhesive. The assembly is further postvulcanization oven-cured to complete its cure. Adhesion tests and the reported results are in accordance with ASTM D429, Method B, 45° angle of stripping.

EXAMPLE I

Zinc phosphatized cold-rolled steel substrates are treated in an argon plasma for various time periods, using the apparatus and method previously described. The metal substrates are immediately dipped into a silicone rubber-metal adhesive comprising an inert organic solvent solution of tetraethylorthosilicate following their removal from the plasma treatment zone. Control zinc phosphatized cold-rolled steel substrates, which have not been plasma treated, are also dipped into the adhesive. After evaporation of the solvent, the adhesively-coated substrates are vulcanization bonded to a vulcanizable silicon elastomer composition for 20 minutes at 124° C. under pressure in a suitable mold. The cure of the silicone elastomer is completed by using a 36-hour stepped oven cure, with the final 24 hours being at 177° C. The bonded assemblies are tested in accordance with ASTM D429, Method B, modified to 45°. The results are reported in Table I.

TABLE I

EFFECT OF ARGON PLASMA TREATING TIME ON ADHESION OF SILICONE TO ZINC PHOSPHATIZED STEEL

| Exposure Time in Argon Plasma | Adhesion PLI/Description |
| --- | --- |
| 0 (Control) | 15.1 Streaky VTR |
| 10 Minutes | 15.2 VTR/M |
| 30 Minutes | 16.2 VTR |
| 60 Minutes | 18.2 VTR |
| 120 Minutes | 19.4 VTR |

All samples dipped in silicone rubber-metal adhesive.
M - Failure at adhesive metal interface.
VTR — Very thin rubber film remaining on metal.
PLI — Peel adhesion, pounds per linear inch.

As can be seen from the data, the adhesion increases with increasing exposure to the argon non-reactive gas plasma. It should be noted that the appearance of the bond also becomes more uniform as a result of the argon plasma treatments. For the particular silicone rubber which is bonded, an adhesion level of 17 PLI is acceptable.

EXAMPLE II

In this example, a plasma treatment comprising a reactive monomer gas plasma is compared to a plasma treatment consisting essentially of argon non-reactive gas plasma. Zinc phosphatized cold-rolled steel substrates are plasma treated as shown in Table II. The reactive monomer gas plasma deposition process involves the use of hexamethyl disilazane monomer (HMDS) having the formula $(CH_3)_3$—Si—NH—Si—$(H_3C)_3$. The HMDS is employed to provide a hydrophobic surface onto the phosphatized metal which would be more compatible with, receptive to or wettable by the silicone rubber-metal adhesive and/or vulcanizable silicone elastomer composition. The metal substrates are, (1), immediately dipped into a silicone rubber-metal adhesive comprising an inert organic solvent solution of tetraethylorthosilicate following their removal from the plasma treatment zone; or, (2), dipped into the adhesive after the indicated layover time between plasma treating and application of the adhesive. Control zinc phosphatized cold-rolled steel substrates, which have not been plasma treated, are also dipped into the adhesive. After evaporation of the solvent, the adhesively-coated substrates are vulcanization bonded to the same vulcanizable silicone elastomer composition employed in Example I, following the procedure of that example. The bonded assemblies are tested in accordance with ASTM D429, Method B, modified to 45°. The results are reported in Table II.

EFFECT OF HMDS PLASMA DEPOSITION ON LAYOVER TIME AND ADHESION OF SILICONE ELASTOMER TO ZINC PHOSPHATIZED STEEL

| Treatment: | Adhesion PLI/ Description |
| --- | --- |
| Control, no plasma, dip silicone rubber-metal adhesive | 15.1 Streaky VTR |
| 1 hour Argon clean, 1 hour HMDS deposition immediate dip silicone rubber-metal adhesive | 19 VTR |
| 1 hour Argon clean, 1 hour HMDS deposition, 24-hour layover, dip silicone rubber-metal adhesive | 18 VTR |
| 1 hour Argon clean, 1 hour HMDS deposition, no adhesive | 16 M |
| 1 hour HMDS deposition, no adhesive | 14 M |
| 1 hour Argon clean, 24-hour layover, dip silicone rubber-metal adhesive | 19 Streaky VTR |

The results shown in Table II illustrate the improvement in adhesion achieved by the plasma argon cleaning and plasma deposition of HMDS processes. It further shows that a suitable silicone rubber-metal adhesive is necessary to achieve satisfactory adhesion. The data also show that the process involving the plasma deposition of HMDS resulted in improved layover time tolerance as compared to the argon plasma treatment only process. The plasma deposited HMDS assemblies retained both a high PLI value and a uniform VTR appearance whereas the argon plasma treated parts resulted in a streaky bond appearance after a 24-hour layover time before applying the silicone rubber-metal adhesive.

EXAMPLE III

Zinc phosphatized cold-rolled steel substrates are treated in an argon plasma for 60 minutes following the procedure described in Example I. The metal substrates are immediately dipped into a silicone rubber-metal adhesive comprising an inert organic solvent solution of tetraethylorthosilicate following their removal from the plasma treatment zone. Control zinc phosphatized cold-rolled steel substrates, which have not been plasma treated, are dipped into the adhesive. After evaporation of the solvent, the adhesively-coated substrates are vulcanization bonded to a vulcanizable silicone elastomer composition having a higher modulus than the silicone elastomer employed in Examples I and II, following the procedure of Example I. The bonded assemblies are tested in accordance with ASTM D429, Method B, modified to 45°. The results, which are self-explanatory, are reported in Table III.

TABLE III

EFFECT OF ARGON PLASMA CLEANING ON ADHESION OF SILICONE ELASTOMER TO ZINC PHOSPHATIZED STEEL

| Treatment: | Adhesion PLI Description |
| --- | --- |
| No plasma, dip in silicone rubber-metal adhesive | 17 Streaky VTR |
| Argon plasma for one hour, dip in silicone rubber-metal adhesive | 27 Uniform R |

What is claimed is:
1. A method for bonding vulcanizable silicone elastomer compositions to phosphatized metal substrates comprising:

(a) exposing to a first glow discharge plasma of a gaseous medium consisting essentially of at least one non-reactive gas at least one phosphatized metal element;
(b) applying over at least one plasma-exposed surface of said phosphatized metal element an adhesive composition suitable for bonding silicone elastomers to metal;
(c) contacting said adhesively-coated surface of said plasma-exposed phosphatized metal element with a vulcanizable silicone elastomer composition; and
(d) subjecting the resultant assembly to conditions sufficient to vulcanize said elastomer and cure said adhesive.

2. A method according to claim 1 wherein said non-reactive gas is selected from the group consisting of helium, nitrogen, neon, argon, krypton and xenon.

3. A method according to claim 1 wherein said at least one non-reactive gas comprises argon.

4. A method according to claim 1 for bonding vulcanizable silicone elastomer compositions to phosphatized metal substrates comprising:
after said exposing to a first plasma of at least one non-reactive gas at least one phosphatized metal element and prior to said applying of said adhesive;
(a) exposing said first plasma-exposed phosphatized metal element to a second glow discharge plasma of a gaseous medium consisting essentially of at least one vaporized silazane monomeric compound having the formula

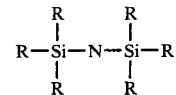

wherein each R can be the same or different, and each is individually selected from the group consisting of hydrogen, halogen, saturated or unsaturated aliphatic and haloaliphatic radical having from one to 8 carbon atoms, saturated and unsaturated cycloaliphatic and halocycloaliphatic radical having 5, 6 or 7 ring carbon atoms and aromatic and haloaromatic radical having 6 or 10 nuclear carbon atoms.

5. A method according to claim 4 wherein said at least one silazane compound comprises hexamethyl disilazane.

6. A method according to claim 4 wherein said at least one non-reactive gas is selected from the group consisting of helium, nitrogen, neon, argon, krypton and kenon.

7. A method according to claim 4 wherein said at least one non-reactive gas comprises argon.

8. A method according to claim 5 wherein said at least one non-reactive gas is selected from the group consisting of helium, nitrogen, neon, argon, krypton and xenon.

9. A method according to claim 5 wherein said at least one non-reactive gas comprises argon.

* * * * *